(12) United States Patent
Shimizu et al.

(10) Patent No.: US 8,991,172 B2
(45) Date of Patent: Mar. 31, 2015

(54) CONTROL DEVICE OF PREMIX COMBUSTION ENGINE

(75) Inventors: Yuuichi Shimizu, Kanagawa (JP); Yuta Furukawa, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 599 days.

(21) Appl. No.: 13/143,219

(22) PCT Filed: Feb. 24, 2010

(86) PCT No.: PCT/JP2010/052885
§ 371 (c)(1),
(2), (4) Date: Sep. 30, 2011

(87) PCT Pub. No.: WO2010/098360
PCT Pub. Date: Sep. 2, 2010

(65) Prior Publication Data
US 2012/0017585 A1     Jan. 26, 2012

(30) Foreign Application Priority Data
Feb. 25, 2009    (JP) ................. 2009-043118

(51) Int. Cl.
*F02D 23/00*     (2006.01)
*F02B 33/44*     (2006.01)
(Continued)

(52) U.S. Cl.
CPC ............... *F02D 23/00* (2013.01); *F02B 37/10* (2013.01); *F02B 37/14* (2013.01); *F02B 37/18* (2013.01);
(Continued)

(58) Field of Classification Search
CPC .......... F02B 37/10; F02B 37/14; F02B 37/18; F02B 39/10; F02B 1/00; F02B 1/04; F02D 23/00; F02D 29/06; F02D 41/0007; F02D 41/18; F02D 41/3035; Y02T 10/144
USPC .......................... 60/602, 607–609; 290/40 R
See application file for complete search history.

(56) References Cited

U.S. PATENT DOCUMENTS 3,062,199 A   *   11/1962   Brueder .................... 123/65 BA
3,303,348 A   *   2/1967   Cox et al. ......................... 60/602
(Continued)

FOREIGN PATENT DOCUMENTS

CN     1585852 A     2/2005
DE     3804013 A1 * 2/1989 ............. F02B 37/10
(Continued)

OTHER PUBLICATIONS

Machine translation of Teruhiro et al. (Pub. No. JP 2001-323825 A) published on Nov. 22, 2001.*
(Continued)

*Primary Examiner* — Thai Ba Trieu
(74) *Attorney, Agent, or Firm* — Kanesaka, Berner & Partners

(57) ABSTRACT

A control device of a premix combustion engine includes a hybrid turbocharger including a turbocharger having a compressor and a turbine, and a motor generator coupled with the compressor. A control unit controls the motor generator based on the operating conditions regarding a generator or the premix combustion engine and includes: an airflow rate computing unit for computing the necessary airflow rate required for the premix combustion engine, and an arithmetic unit for computing the power output or the rotation speed regarding the hybrid turbocharger to obtain the necessary airflow rate required for the premix combustion engine. Feedback control regarding the power output or the rotation speed as to the hybrid turbocharger is performed based on the computed results obtained by the arithmetic unit.

3 Claims, 5 Drawing Sheets

(51) Int. Cl.
*F02N 11/06* (2006.01)
*F02B 37/10* (2006.01)
*F02B 37/14* (2006.01)
*F02B 37/18* (2006.01)
*F02B 39/10* (2006.01)
*F02D 29/06* (2006.01)
*F02D 41/00* (2006.01)
*F02D 41/18* (2006.01)
*F02D 41/30* (2006.01)

(52) U.S. Cl.
CPC ............ *F02B 39/10* (2013.01); *F02D 29/06* (2013.01); *F02D 41/0007* (2013.01); *F02D 41/18* (2013.01); *F02D 41/3035* (2013.01); *Y02T 10/144* (2013.01)
USPC .......................... 60/602; 60/608; 290/40 R

(56) References Cited

U.S. PATENT DOCUMENTS

| | | | |
|---|---|---|---|
| 4,833,887 A | 5/1989 | Kawamura et al. | |
| 6,415,606 B1* | 7/2002 | Bowman et al. | 60/608 |
| 6,931,850 B2* | 8/2005 | Frank et al. | 60/608 |
| 7,076,954 B1* | 7/2006 | Sopko et al. | 60/608 |
| 7,137,253 B2* | 11/2006 | Furman et al. | 60/608 |
| 7,174,714 B2* | 2/2007 | Algrain | 60/608 |
| 7,478,533 B2* | 1/2009 | Ueno | 60/608 |
| 7,779,634 B2* | 8/2010 | Barthelet et al. | 60/607 |
| 7,827,790 B2* | 11/2010 | Kimoto et al. | 60/608 |
| 7,992,389 B2* | 8/2011 | Furman et al. | 60/608 |
| 8,143,732 B2* | 3/2012 | Algrain | 290/1 A |
| 2003/0188533 A1* | 10/2003 | Jaster | 60/608 |
| 2006/0196182 A1* | 9/2006 | Kimoto et al. | 60/605.1 |

FOREIGN PATENT DOCUMENTS

| | | |
|---|---|---|
| JP | 62-48932 A | 3/1987 |
| JP | 5-280385 A | 10/1993 |
| JP | 2001-323825 A | 11/2001 |
| JP | 2006-242064 A | 9/2006 |
| JP | 200845411 A | 2/2008 |
| JP | 2008-75485 A | 4/2008 |
| JP | 2008-101552 A | 5/2008 |
| JP | 2009-36021 A | 2/2009 |

OTHER PUBLICATIONS

Notice of Allowance corresponding to JP2011-501626, dated Apr. 30, 2013.
Office Action mailed Jun. 27, 2013 corresponds to Chinese patent application No. 201080007493.1.
International Preliminary Report on Patentability for PCT/JP2010/052885 mailed Aug. 30, 2011.
International Preliminary Report on Patentability for PCT/JP2010/052885 mailed Sep. 13, 2011.
International Search Report for PCT/JP2010/052885 mailed Mar. 30, 2010.
Notification of the decision to grant a patent dated Dec. 31, 2014, corresponding to Chinese patent application No. 201080007493.1.

* cited by examiner

CONTROL DEVICE OF PREMIX COMBUSTION ENGINE

RELATED APPLICATIONS

The present application is a National Phase Application Number PCT/JP2010/052885, filed Feb. 24, 2010 and claims priority from, Japanese Application Number 2009-043118, filed Feb. 25, 2009.

BACKGROUND OF THE INVENTION

1. Field of the Invention

The present invention relates to a control device of a premix combustion engine coupled with a hybrid turbocharger. Hereby, the control device also unit an engine control-device system including, but not limited to, the engine, the hybrid turbocharger and the control device.

2. Background of the Invention

According to a conventional technology such as disclosed by Patent Reference 1, a control device of a premix combustion engine 1 coupled with a hybrid turbocharger connected to a motor generator is publicly known. As shown in FIG. 4, with regard to the control device of the premix combustion engine 1 disclosed by Patent Reference 1, the charge air inlet 1b of the premix combustion engine 1 is connected to a compressor 2a and a fuel tank 3, and an exhaust gas outlet 1c of the premix combustion engine 1 is connected to a turbine 2b. Further, a rotating shaft 2c of the turbocharger 2c connects the turbocharger to a motor generator 4 that has a motor function as well as a generator function. The turbocharger 2 coupled with the motor generator 4 forms a hybrid turbocharger. A generator 5 is connected to the premix combustion engine 1 via a rotating shaft 1a; the generator 5 is provided with and connected to a detected unit 6 for detecting the charging airflow rate regarding the premix combustion engine 1 and the electric power generated by the generator 5. The detected signals from the detected unit 6 are transferred to a control unit 7, which transmits changeover signals toward the motor generator 4 so as to change the motor function to the generator function and vice versa.

In the next place, with reference to FIG. 5, the control method of the premix combustion engine 1 is explained. In the step S1 after the premix combustion engine 1 started, the control unit 7 reads the detected signals from the detecting unit 6; in the next step S2, it is judged whether or not the charging airflow rate (delivered by the turbocharger 2) is the right amount, based on the detected signals from the detecting unit 6, as well as, based on the data stored in the memory section in the control unit 7. In the next step S3, when the airflow rate is in shortage, the control unit 7 issues a changeover signal toward the motor generator 4 so that the motor generator 4 serves the motor function. In starting the premix combustion engine 1, the motor generator 4 receives the changeover signal to put the motor generator 4 under the motor function; then, the motor generator 4 acts as a motor. Thus, the motor generator 4 is driven by the electric power sent through an electric power line 8. Driving the motor generator 4 starts the operation of the turbocharger 2, via the rotating shaft 2c, When the turbocharger 2 is operated in this way, the charging air of an appropriate airflow rate is supplied to the premix combustion engine 1; and, the starting performance regarding the premix combustion engine 1 is enhanced. In addition, the stable operation regarding the premix combustion engine 1 is achieved from the engine start.

Further, when it is judged that the charging airflow rate is in shortage during the operation of the premix combustion 1, the control unit 7 issues a changeover signal toward the motor generator 4 so that the motor generator 4 serves the motor function, in the step S3.

On the other hand, when it is judged that the charging airflow rate is excessive, the control unit 7 issues a changeover signal toward the motor generator 4 so that the motor generator 4 serves the generator function, in the step S4; thereby, even if the rotation speed of the turbocharger 2 is excessive in response to the excessive charging airflow rate, the driving power thereof is utilized as the generating power energy for the motor generator 4, in the step S4.

Further, when it is judged that the charging airflow rate is appropriate, the control unit 7 de-energizes the function changeover signal toward the motor generator 4, in the step S5; receiving the de-energized function changeover signal from the control unit 7, the motor generator 4 stops serving the motor function or the generator function.

As described above, when the charging airflow rate is in shortage, the motor generator 4 serves the motor function so as to drive the turbocharger 2; hence, the starting performance regarding the premix combustion engine 1 is enhanced. Further, when the charging airflow rate is excessive, the motor generator 4 serves the generator function so that the motor generator 4 receives the driving power from the turbocharger 2 and generates the electric power; accordingly, the energy utilization performance regarding the premix combustion engine 1 is enhanced. Further, when the operation of the premix combustion engine 1 is controlled so as to appropriately maintain the charging airflow rate, the premix combustion engine 1 can be free from incomplete combustion due to the excessiveness or shortage regarding the charging airflow rate. In this way, the premix combustion engine 1 is controlled; and, when the control is finished, the airflow control regarding the premix combustion engine 1 is stopped, in the step S6. In a case where the control is continued, the step S6 returns to the step S1.

REFERENCES

Patent References

Patent Reference 1: JP2001-323825

SUMMARY OF THE INVENTION

Subjects to be Solved

However, according to the control device of the premix combustion engine 1 disclosed in Patent Reference 1 quoted above, the precise control, of air-fuel ratio regarding the premix combustion engine becomes important, as the combustion in the engine is greatly influenced by the air fuel ratio. Nevertheless, it is difficult to mention that, in the conventional approach, the air fuel ratio is changed (controlled) with satisfactory precision. More in detail, in the conventional way, in a case where the charging airflow rate is in shortage during the engine start, the motor generator 4 serves the motor function; on the other hand, in a case where the charging airflow rate is excessive, the motor generator 4 serves the generator function; however, only on-off control is performed. Thereby, in the on-off control, only the charging airflow rate to be measured is the object to be controlled.

As described, above, since only the on-off control regarding the motor generator 4 is performed, it is difficult to mention that the air fuel ratio control regarding the premix combustion engine is performed with satisfactory accuracy; thus, it is difficult to achieve a desired air fuel ratio with accuracy, in the conventional approaches. Moreover, when the motor generator 4 acts as a generator, the generating power cannot exceeds the rating power (capacity power) of the motor generator 4; thus, in a case where the possible generating power to be absorbed from the turbocharger exceeds the rating power of the motor generator 4, the control to make the motor generator act as a generator is no longer effective. In other words, in a case where the charging airflow rate is still excessive in spite of the power generation by the motor generator 4 (namely, in spite of the energy absorption into the charging-air), it becomes difficult to control the air fuel ratio by unit of the motor generator 4; and, the excessiveness of the air fuel ratio cannot be cancelled. Incidentally, the air fuel ratio hereby may be regarded as the ratio of the air (in mass) in the air fuel mixture to the fuel (in mass) in the air fuel mixture.

In view of the difficulties in the conventional technology as described above, the present invention aims at providing a control device that controls the air fuel ratio of a premix combustion engine with enhanced accuracy, so as to achieve an appropriate fuel air ratio.

Unit to Solve the Subjects

In order to overcome the above-described difficulties, the present invention provides premix combustion engine, the device includes, but is not limited to, a hybrid turbocharger including a turbocharger having a compressor and a turbine, and a motor generator coupled with the compressor via a rotating shaft; the premix combustion engine in which air is supplied, from the compressor, and from which exhaust gas is discharged toward the turbine, a generator coupled with the premix combustion engine via a rotating shaft, and a control unit for controlling the motor generator based on operating conditions of the generator or the premix combustion engine, wherein the control device of a premix combustion engine includes: a necessary airflow rate computing unit for calculating a necessary airflow rate required for the operation of the premix combustion engine, and an arithmetic unit for calculating a power output or a rotation speed of the hybrid turbocharger so that the necessary airflow rate required for the premix combustion engine is obtained which is calculated based on the necessary airflow rate computing unit, and wherein the control unit controls the power output or the rotation speed of the hybrid turbocharger based on the calculated results obtained by the arithmetic unit.

A preferable embodiment of the above disclosure is the control device of the premix combustion engine, the device further including, but not limited to, a charging air measuring unit for measuring the airflow rate of the air supplied to the premix combustion engine from the compressor, wherein the arithmetic unit performs a feedback control regarding the power output or the rotation speed of the hybrid turbocharger so that a measurement airflow rate measured by the charging air measuring unit is in consonance with a necessary airflow rate of the premix combustion engine calculated by the necessary airflow rate computing unit.

According to the above, the difference between the necessary airflow rate computed by the necessary airflow rate computing unit and the measurement airflow rate measured by the charging air measuring unit is computed; and, based on the computed difference, the arithmetic unit performs a feedback control regarding the rotation speed regarding the hybrid turbocharger coupled with the compressor. Thus, the charging airflow rate can be continuously and smoothly changed, and the premix combustion engine can be operated under the condition of further appropriate air-fuel ratio in comparison with the conventional air-fuel ratio.

Another preferable embodiment is the control device of the premix combustion engine, wherein it is judged that the rotation speed of the turbocharger is excessive when the necessary airflow rate calculated by the necessary airflow rate computing unit is smaller than the measurement airflow rate, it is judged that the rotation speed of the turbocharger is in shortage when the necessary airflow rate calculated by the necessary airflow rate computing unit is greater than the measurement airflow rate, and a to-be-newly-revised setting value regarding the rotation speed of the turbocharger is calculated based on the results.

Another preferable embodiment is the control device of the premix combustion engine, wherein a comparison between a to-be-newly-revised rotation speed setting order toward the motor generator and a current rotation speed setting order toward the motor generator is performed, it is judged that the generating power of the motor generator is in shortage when the to-be-newly-revised rotation speed setting order toward the motor generator is smaller than the current rotation speed setting order, it is judged that the generating power of the motor generator is excessive when the to-be-newly-revised rotation speed setting order toward the motor generator is greater the current rotation speed setting order, and the feedback control is performed so that the to-be-newly-revised setting value regarding the rotation speed of the motor generator is calculated based on the results.

As described above, based on the difference between the necessary airflow rate computed by the necessary airflow rate computing unit and the measurement airflow rate, the to-be-newly-revised rotation speed setting order regarding the rotation speed of the motor generator coupled with the turbocharger is computed; the rotation speed of the motor generator is controlled so that the rotation speed agrees with the speed setting order. In this way, the airflow rate can continuously and smoothly respond to the necessary airflow rate, and the premix combustion engine can be operated under the condition of further accurate and appropriate air-fuel ratio in comparison with the conventional air-fuel ratio.

Another preferable embodiment is the control device of the premix combustion engine, the premix combustion engine including, but is not limited to, an exhaust gas bypass unit having a bypass passage and a flow rate regulating valve provided on the bypass passage so as to adjust the output of the turbine, wherein the flow rate regulating valve is controlled so as to control the opening and closing of the bypass passage in response to the generating power or the rotation speed of the hybrid turbocharger, and the flow rate regulating valve is operated so that the bypass passage is opened when the generating power of the hybrid turbocharger exceeds a prescribed maximum level.

According to the invention as described above, the premix combustion engine is provided with an exhaust gas bypass unit having a bypass passage and a flow rate regulating valve provided on a part way of the bypass passage; thus, when the power output from the hybrid turbocharger reaches a predetermined level, the part of the exhaust gas bypasses the hybrid turbocharger and streams into the bypass passage; the power output of the turbine is decreased and the flow rate of the air charged into the premix combustion engine is reduced; the charging airflow rate can be stably controlled at a constant rate, even when the power output of the motor generator is at the maximum level and the charging airflow rate is excessive. Further, when the energy of the exhaust gas that bypasses the turbocharger is utilized, energy conservation can be realized; thereby, the charging airflow rate can be controlled, even when the specification of the turbocharger is established so that the power output from the hybrid turbocharger during steady state operation is always kept at the maximum level; therefore, the power output can be kept steady at the maximum level. Further, when the power output of the motor generator coupled with the turbocharger reaches the maximum level, a part of the exhaust gas from the premix combustion engine may bypass the turbine and stream through the bypass passage.

Effects of the Invention

According to the control device of a premix combustion engine, by controlling the power output or the rotation speed regarding the hybrid turbocharger, the air-fuel ratio of the premix combustion engine can be still more accurately controlled, and the achieved air-fuel ratio is appropriate.

BRIEF DESCRIPTION OF THE DRAWINGS

The present invention will now be described in greater detail with reference to the preferred embodiments of the invention and the accompanying drawings, wherein.

DETAILED DESCRIPTION OF THE PREFERRED EMBODIMENTS

Hereafter, the present invention will be described in detail with reference to the aspects shown in the figures. However, the dimensions, materials, shape, the relative placement and so on of a component described in these aspects shall not be construed as limiting the scope of the invention thereto, unless especially specific mention is made. In other words, the aspects and the figures are simply for explanation use.

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 1:
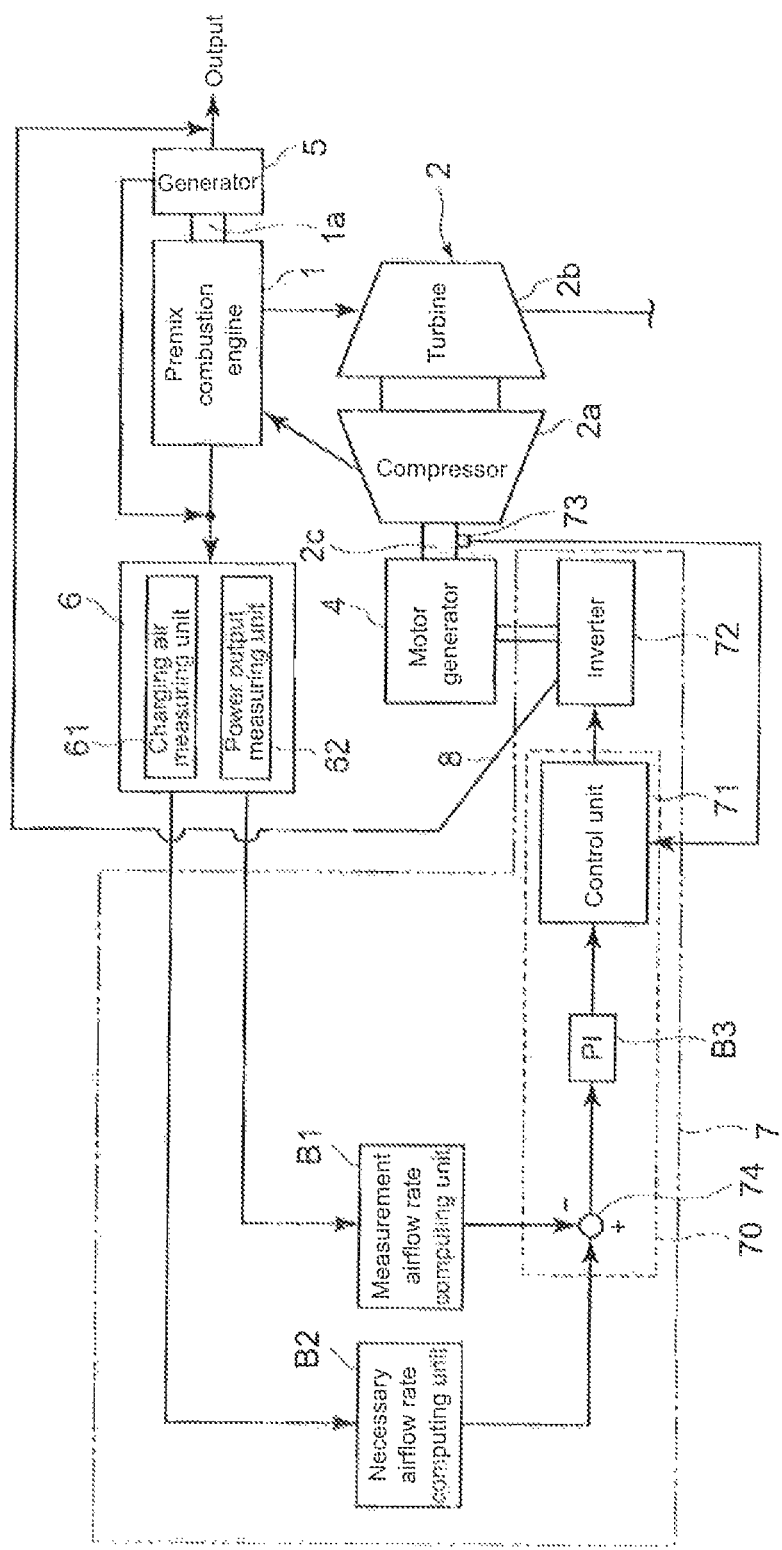
FIG. 1 explains a control device of a premix combustion engine, according to a first embodiment of the present invention.

FIG. 1 shows a control device of a premix combustion engine, according to a first embodiment of the present invention. As shown in FIG. 1, the control device of the premix combustion engine according to this embodiment includes, but not limited to: a turbocharger 2 having a compressor 2a and a turbine 2b, and a motor generator 4 coupled with the compressor 2a via a rotation shaft 2c.

The turbocharger 2 and the motor generator 4 form a hybrid turbocharger.

Further, the control device of the premix combustion engine according to this embodiment includes, but not limited to: the premix combustion engine 1 in which the air from the compressor 2a is charged, as well as, from which the exhaust gas streams into the turbine 2b; and a generator 5 that is coupled with the premix combustion engine 1 via a rotating shaft 1a.

Further, the control device of the premix combustion engine according to this embodiment includes, but not limited to, a control unit 7 that controls the power output of the motor generator 4 based on the operating conditions of the generator 5 or the premix combustion engine 1.

The motor generator 4 is connected to and provided with an electric power line 8 so that the electric power is taken out from the motor generator 4 through the line 8 when the motor generator 4 acts as a generator, or the electric power is supplied to the motor generator 4 through the line 8 when the motor generator 4 acts as a motor.

Another end of the electric power line 8 is connected to the power line of the generator 5, and the power output of the motor generator 4 is added to the power output of the generator 5.

Incidentally, the premix combustion engine is an engine in which fuel is charged into the combustion chamber after being premixed with air, as a part of air fuel mixture; concretely, in the examples of the fuel, gas (gasoline), liquid, fuel such as gas oil, and gaseous fuel are included. In this embodiment, a gas engine for generator use is taken into consideration as an example; and, the gas engine is a premix combustion engine whereby the fuel gas is supplied to the engine combustion chamber after the fuel gas is prefixed with air.

Further, the control device of the premix combustion engine according to this embodiment includes, but not limited to, a detecting unit 6 for detecting the operating conditions of the generator 5 and the premix combustion engine 1, the detecting unit including, but not limited to: a charging air measuring unit 61 that measures the flow rate or the (charging) air supplied to the premix combustion engine 1 from the compressor 2a; and, a power output measuring unit 62 that measures the power output of the generator 5 coupled with the premix combustion engine 1.

Hereby, it is noted that a publicly known flow meter can be used as the charging air measuring unit 61. Incidentally, since the charging air pressure, the charging air temperature, the oxygen concentration in the exhaust gas and so on are taken into consideration in relation to the (charging) airflow rate measurement, the airflow rate unit a mass flow rate.

Further, the control device of the premix combustion engine according to this embodiment includes, but not limited to, an arithmetic unit 70 for computing the power output or the rotation speed regarding the hybrid turbocharger, in the control unit 7, based on the measurement airflow rate measured by charging air measuring unit 61, as well as, based on the necessary airflow rate computed as per the measured power output measured by the power output measuring unit 62, so that the measurement airflow rate agrees with the necessary airflow rate. Hereby, the necessary airflow rate is the airflow rate needed for the premix combustion engine 1. Further, based on the computation results by the arithmetic unit 70, the feedback control is performed regarding the power output or the rotation speed of the hybrid turbocharger.

Incidentally, in this embodiment, the electric power output of the hybrid turbocharger is the electric power output generated by the motor generator 4; the rotation speed of the hybrid turbocharger is the rotation speed of the rotating shaft 2.

It is hereby noted that, for instance, the CPU provided in the control unit 7 can be used as the arithmetic unit 70; the control unit 7 includes various elements such as electric circuit including CPU, or software stored in memories.

In the control unit 7, the correction value regarding the flow rate of the air to be supplied to the premix combustion engine 1 is determined by two factors, namely, the measurement airflow rate and the necessary airflow rate; whereby, the measurement airflow rate is computed by use of the measurement airflow rate computing unit (cf. BLOCK B1 in FIG. 1), based on the measurement results according to the power output measuring unit 62, while the necessary airflow rate is computed by use of the necessary airflow rate computing unit (cf. BLOCK B2 in FIG. 1), based on the measurement results according to the charging air measuring unit 61.

Further, the difference between the computed measurement airflow rate and the computed necessary airflow rate is inputted in to PI operator (cf. BLOCK B3 in FIG. 1) so that a PI (proportional/integral) operation is performed; and, the power output of the motor generator 4 is computed. A rotation control unit 71 controls the rotation speed of the motor generator 4 so that the difference is cleared to zero; thereby, the rotation speed of the generator motor 4 acting as an AC motor is controlled via an inverter 72 that electrically generates AC power from D.C power. The processes in the blocks B1 to B3 in FIG. 1 can be handled, for instance, by the CPU installed in the control unit 7 and the software registered in the memory installed in the rotation control unit 71. Naturally, the processes can be handled also by a hardware apparatus forming a comparison/judgment circuit.

Figure 3:
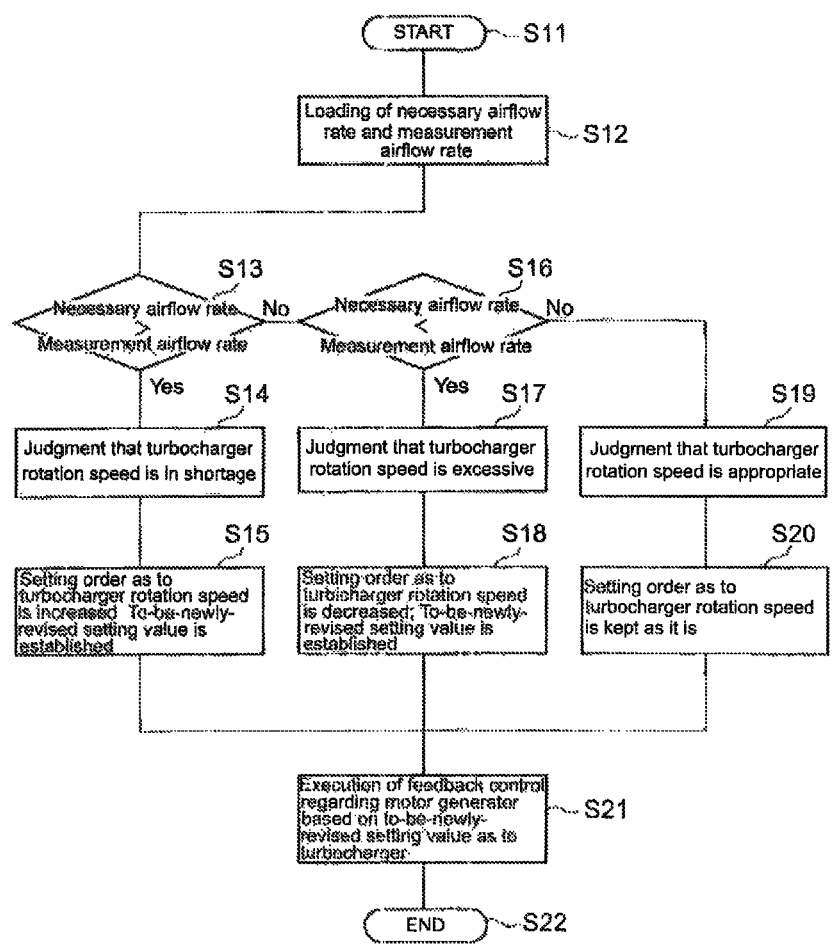
FIG. 3 explains the outline control flow of arithmetic unit according to the first embodiment.
Figure 4:
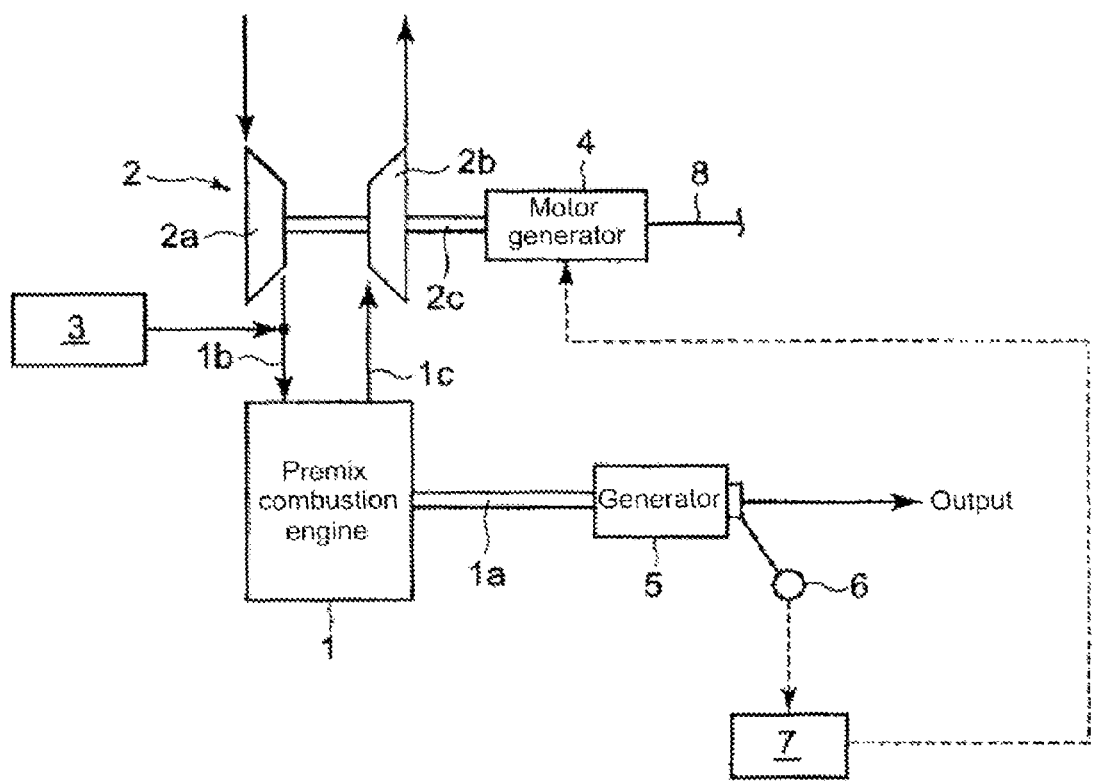
FIG. 4 explains the configuration regarding the conventional control device of the premix combustion engine.
Figure 5:
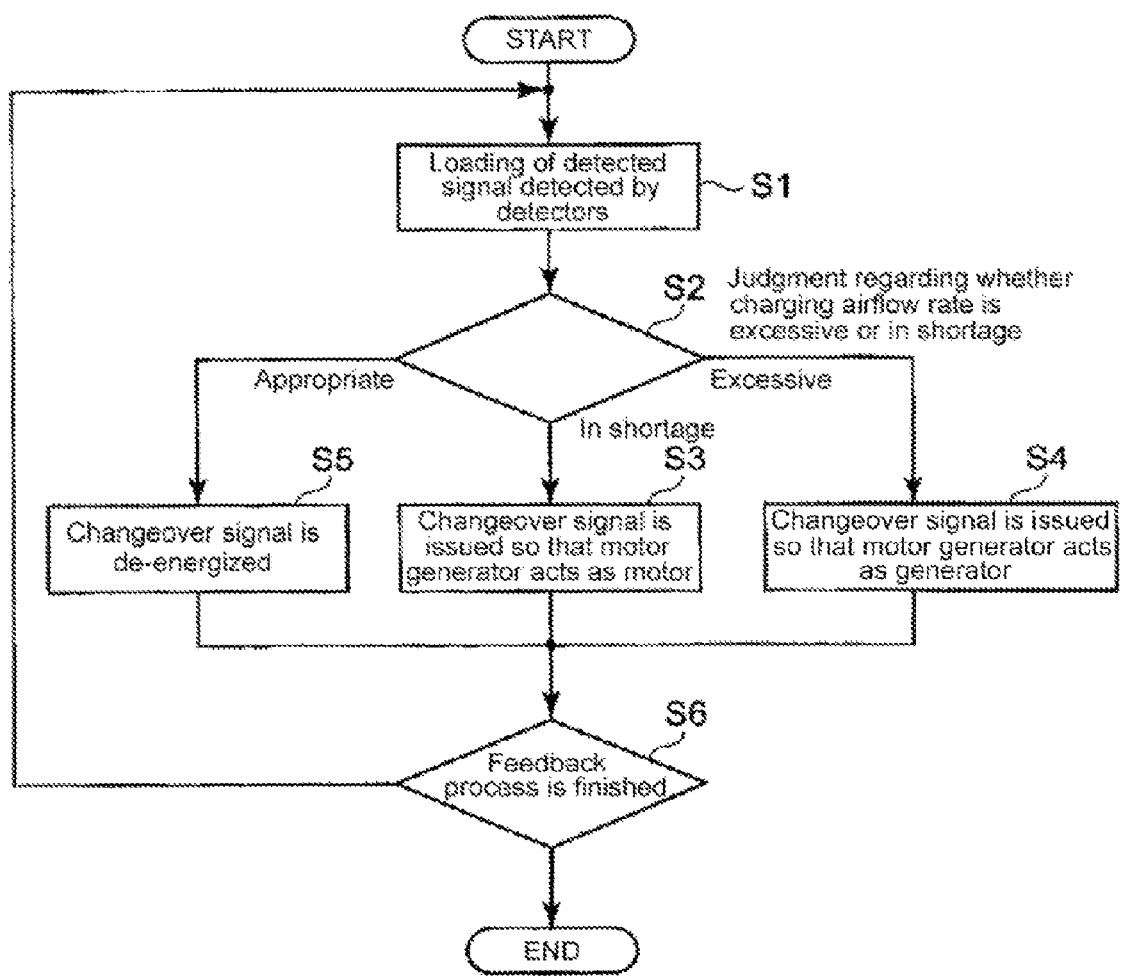
FIG. 5 explains the control process flow regarding the control device of the premix combustion engine in FIG. 4.

In the next place, with reference to the flow chart in FIG. 3, the above-described feedback control by which the power output or the rotation speed of the hybrid turbocharger is regulated is now explained.

In the step S11, a series of steps starts; in the next step S12, the necessary airflow rate computed by the necessary airflow rate computing unit B2 and the measurement airflow rate computed by the measurement airflow rate computing unit B1 are loaded. In FIG. 1, these airflow rates are inputted in an adder-subtractor 74, and the difference is computed.

In the following step S13, it is judged whether or not the necessary airflow rate is greater than the measurement airflow rate; when the judgment is affirmative, the step S13 is followed by the step S14, whereby it is judged that the rotation speed of the turbocharger is in shortage. Further, in the step S15, the rotation speed setting value regarding the turbocharger is increased so that increased value is established as a new setting value.

In the step S13, when the judgment is negative, the step S13 is followed by the step S16, whereby it is judged whether or not the necessary airflow rate is smaller than the measurement airflow rate; when the judgment is affirmative, the step S16 is followed by the step S17; in the step S17, it is judged that the rotation speed of the turbocharger is excessive. Then, in the step S18, the rotation speed setting value regarding the turbocharger is decreased so that the decreased value is established as a new setting value.

In addition, in the step S16, when it is judged that the necessary airflow rate is not smaller than the measurement airflow rate, namely, when the necessary airflow rate is almost equal to the measurement airflow rate, the step S16 is followed by the step S19; in the step S19, it is judged that the rotation speed of the turbocharger is within an appropriate range. Then, in the step S20, the rotation speed setting value regarding the turbocharger maintains the status quo.

Further, based on the new setting value established in the step S15 or the step S18, or based on the maintained setting value confirmed in the step S20, the feedback control regarding the rotation speed of the motor generator 4 is performed in the step S21 that follows the step S15, the step S18 or the step S20; and, at the step S21, a series of control processes regarding a feedback control repetition finishes.

In the feedback control regarding the motor generator 4, the newly established setting value (an order signal) toward the motor generator 4 is compared with the setting value (an order signal) at the present time; incidentally, the setting value (an order signal) at the present time is the rotation speed of the rotating shaft 2c of the motor generator 4, and the rotation speed is detected by a speed sensor 73. When the newly established setting value is smaller than the setting value at the present time, it is judged that the power output of the motor generator 4 is in shortage; when the newly established setting value is greater than the setting value at the present time, it is judged that the power output of the motor generator 4 is excessive. Based on these judgments, the feedback control regarding the to-be-newly-established setting value is performed.

In addition, in the control of the motor generator 4, when the new setting value regarding the rotation speed is greater than the setting value regarding the rotation speed at the present time, namely, when the power output of the motor generator is excessive and the charging airflow rate is in shortage, the power output is controlled on the minus side so that the motor generator 4 acts as a motor and the necessary airflow rate is obtained.

In this way, with regard to the control of the motor generator 4, beside the plus side power output, the minus side power output is taken account of; thus, the charging airflow rate can be continuously and smoothly controlled.

As described above, in the control device of the premix combustion engine according to a first embodiment, the difference between the necessary flow rate of the air to be supplied to the premix combustion engine 1 and the measurement airflow rate is computed so that the control unit 7 controls the power output or the rotation speed regarding the motor generator 4 coupled with the compressor 2a; thus, the premix combustion engine 1 can be operated always with an appropriate air-fuel ratio.

Second Embodiment

FIG. 1 shows a control device of the premix combustion engine, according to a second embodiment of the present invention. Incidentally, the same components in the second embodiment as in the first embodiment are given common numerals; and, explanation repetitions are omitted.

Figure 2:
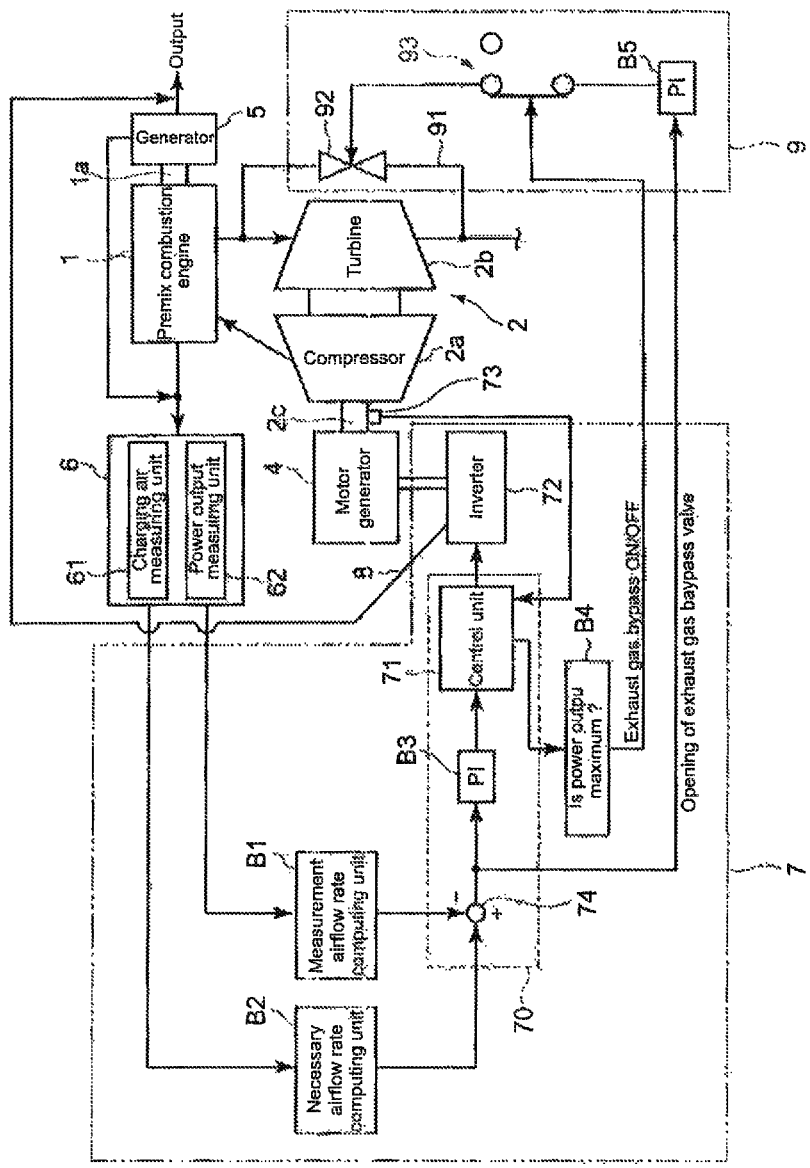
FIG. 2 explains a control device of the premix combustion engine, according to a second embodiment of the present invention.

The second embodiment differs from the first embodiment in that an exhaust gas bypass unit 9 is provided. As shown in FIG. 2, the exhaust gas bypass unit 9 includes, but not limited to: a bypass passage 91, and an exhaust gas bypass valve 92 that is a flow regulating valve arranged on a part way of the bypass passage 91. The exhaust gas bypass valve 92 is of a proportional control type. The exhaust gas bypass unit 9 is controlled in response to the power output or the rotation speed regarding the motor generator coupled with the hybrid turbocharger, so that the opening level of the bypass passage 91 is regulated. Further, when the power output regarding the motor generator coupled with the hybrid turbocharger reaches the maximum output, the exhaust gas bypass valve 92 is actuated so that the bypass passage opens.

More in detail, the correction value regarding the opening level of the exhaust gas bypass valve 92 is determined by two factors, namely, the measurement airflow rate and the necessary airflow rate; whereby, the measurement airflow rate is computed by use of the measurement airflow rate computing unit (cf. BLOCK B1 in FIG. 2), based on the measurement results according to the power output measuring unit 62, while the necessary airflow rate is computed by use of the necessary airflow rate computing unit (cf. BLOCK B2 in FIG. 2), based on the measurement results according to the charging air measuring unit 61; and, the control order regarding the opening level of the exhaust gas bypass valve 92 is determined so that the difference between the two factors is cleared to zero (cf. BLOCK B5 in FIG. 2).

Further, the arithmetic unit 70 judges whether or not the power output of the motor generator (or the turbocharger) reaches the maximum rating (cf. BLOCK B4 in FIG. 2); and, the control unit 71 controls the on-off movement of a switch 93. In response to this on-off control of the switch 93, the control order from BLOCK B5 in FIG. 2 is transmitted at some point in time or not transmitted at another point in time, toward the exhaust gas bypass valve 92. As is the case with the first embodiment, the processes in the blocks B1 to B4 in FIG. 2 can be handled, for instance, by the CPU installed in the control unit 71 and the software registered in the memory installed in the control unit 71.

As described above, in the control device of the premix combustion engine 1, the engine 1 is provided with the exhaust gas bypass unit 9 in which a part of the exhaust gas streams; and, when the power output from the hybrid turbocharger exceeds a predetermined level, the part of the exhaust gas bypasses the hybrid turbocharger and streams into the bypass passage 91; the power output of the turbine is decreased and the flow rate of the air charged into the premix combustion engine 1 is reduced; thus, the charging airflow rate can be controlled, even when the power output of the motor generator is at the maximum level and the charging airflow rate is excessive. Further, when the energy of the exhaust gas that bypasses the turbocharger is utilized, energy conservation can be realized; thereby, the specification of the turbocharger may be determined so that the power output from the hybrid turbocharger during steady state operation is always kept at the maximum level.

Thus far, the embodiments according to the present invention have been explained; it goes without saying that the present invention is not limited to the above-described embodiment, and there can be other various modes under the condition that the modes keep the features of the present invention.

INDUSTRIAL APPLICABILITY

According to the control device of a premix combustion engine, the air-fuel ratio of the premix combustion engine can be still more accurately controlled, and the achieved air-fuel ratio is appropriate. The configuration regarding the features as per the present invention can be applied to any control device incorporated in a premix combustion engine.

The invention claimed is:

1. An air-fuel ratio control device of a premix combustion engine, the device comprising:
   a hybrid turbocharger comprising a turbocharger having a compressor and a turbine, and
   a motor generator coupled with the compressor via a rotating shaft;
   the premix combustion engine in which air is supplied from the compressor, and from which exhaust gas is discharged toward the turbine,
   a generator coupled with the premix combustion engine via a rotating shaft,
   a charging air measuring unit coupled to the premix combustion engine for measuring an airflow rate of the air supplied to the premix combustion engine from the compressor, and
   a control unit for controlling the motor generator based on operating conditions of the generator or the premix combustion engine,
   the control unit comprising a CPU configured to
   calculate an airflow rate required for the operation of the premix combustion engine with an air-fuel ratio based on a power output of the generator; and
   calculate a power output or a rotation speed of the hybrid turbocharger so that a difference between the calculated airflow rate and the measured airflow rate approaches zero; and
   an exhaust gas bypass unit having
   a bypass passage,
   a flow rate regulating valve provided on the bypass passage so as to adjust the output of the turbine, and
   a switch configured to transmit a control order regarding an opening level of the flow rate regulating valve to the flow rate regulating valve, the control order determined based on the difference between the calculated airflow rate and the measured airflow rate so that the difference approaches zero,
   wherein:
   the CPU is configured to judge whether or not the power output of the hybrid turbocharger exceeds a prescribed maximum level, and
   the CPU is configured to turn on the switch so as to transmit the control order to the flow rate regulating valve and control the opening and closing of the flow rate regulating valve when the power output of the hybrid turbocharger exceeds the prescribed maximum level.

2. The air-fuel ratio control device of claim 1, wherein:
   the CPU is configured to judge that the rotation speed of the turbocharger is excessive when the calculated airflow rate is smaller than the measured airflow rate,
   the CPU is configured to judge that the rotation speed of the turbocharger is in shortage when the calculated airflow rate is greater than the measured airflow rate, and
   the CPU is configured to calculate a to-be-newly-revised setting value regarding the rotation speed of the turbocharger based on the judgment results.

3. The air-fuel ratio control device of claim 2, wherein:
   the CPU is configured to perform a comparison between a to-be-newly-revised rotation speed setting order toward the motor generator and a current rotation speed setting order toward the motor generator,
   the CPU is configured to judge that the generating power of the motor generator is in shortage when the to-be-newly-revised rotation speed setting order toward the motor generator is smaller than the current rotation speed setting order,
   the CPU is configured to judge that the generating power of the motor generator is excessive when the to-be-newly-revised rotation speed setting order toward the motor generator is greater than the current rotation speed setting order, and
   the CPU is configured to perform the feedback control so as to calculate the to-be-newly-revised setting value regarding the rotation speed of the motor generator based on the judgment results.

* * * * *